United States Patent [19]

Chun

[11] Patent Number: 4,533,330
[45] Date of Patent: Aug. 6, 1985

[54] PEDAL POWERED SAILBOAT

[76] Inventor: Andrew Chun, #235, 3rd Ka, Nowon-dong, Puk-ku, Daegu, Rep. of Korea

[21] Appl. No.: 524,355

[22] Filed: Aug. 18, 1983

[51] Int. Cl.³ ............................................. B63H 16/00
[52] U.S. Cl. ........................................ 440/30; 440/21; 280/213
[58] Field of Search ...................... 440/21, 26, 30, 31; 114/39, 43; 280/213

[56] References Cited

U.S. PATENT DOCUMENTS

| | | | |
|---|---|---|---|
| 2,930,340 | 3/1960 | Sessions | 440/30 |
| 3,031,692 | 5/1962 | Riek | 440/30 |
| 3,395,664 | 8/1968 | Greenberg | 280/213 |
| 4,077,351 | 3/1978 | Girona | 440/30 |
| 4,318,700 | 3/1982 | Price | 440/26 |
| 4,408,772 | 10/1983 | Hollwarth | 280/213 |

Primary Examiner—Trygve M. Blix
Assistant Examiner—C. T. Bartz
Attorney, Agent, or Firm—Frank Frisenda, Jr.

[57] ABSTRACT

The present invention provides a pedal powered amphibious sailboat apparatus. In one embodied form, the inventive boating apparatus comprises a relatively lightweight hull with peripheral air tanks along the interior walls of the hull, two pedalling stands which translate the rotational movement of the foot pedalling by one or two occupants to a gearing system by means of drive chains, which synchronously causes rotational movements of a screw propeller and a pair of wheels in the rear of the hull. Accordingly, the unique pedal powered sailboat apparatus of the present invention is capable of cruising water with pedal power of the occupants and capable of land transportation without use of a fossil fueled combustion engine or electricity.

5 Claims, 6 Drawing Figures

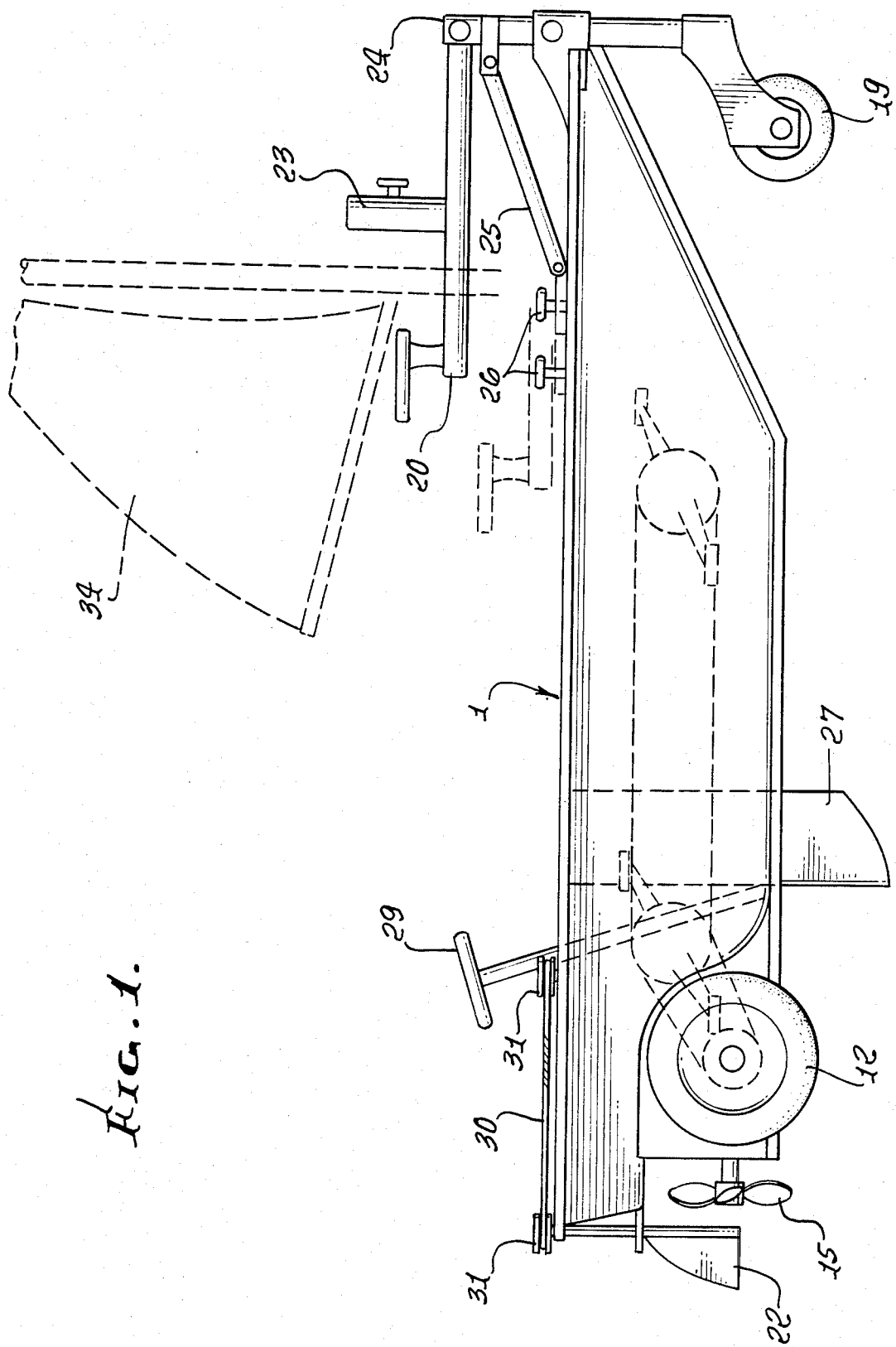

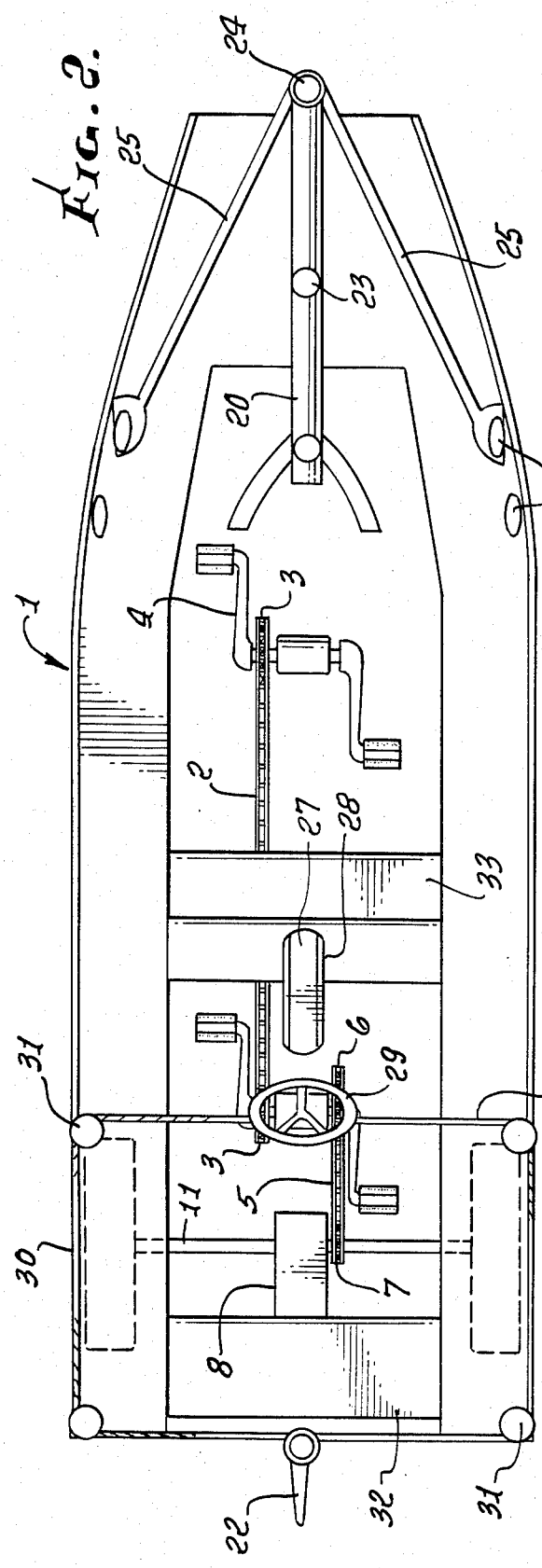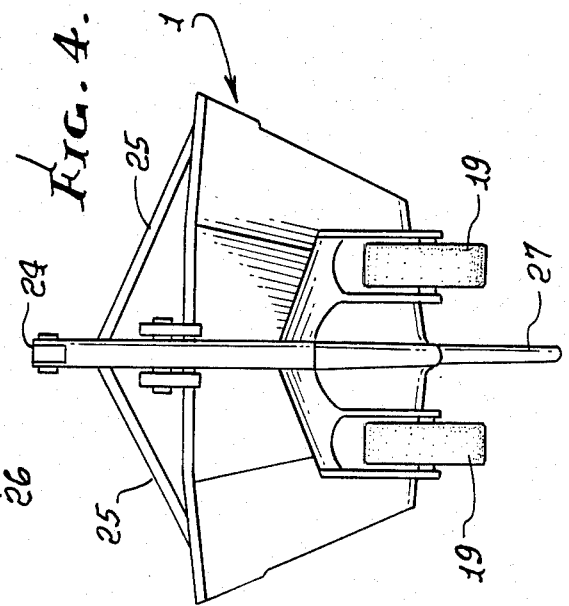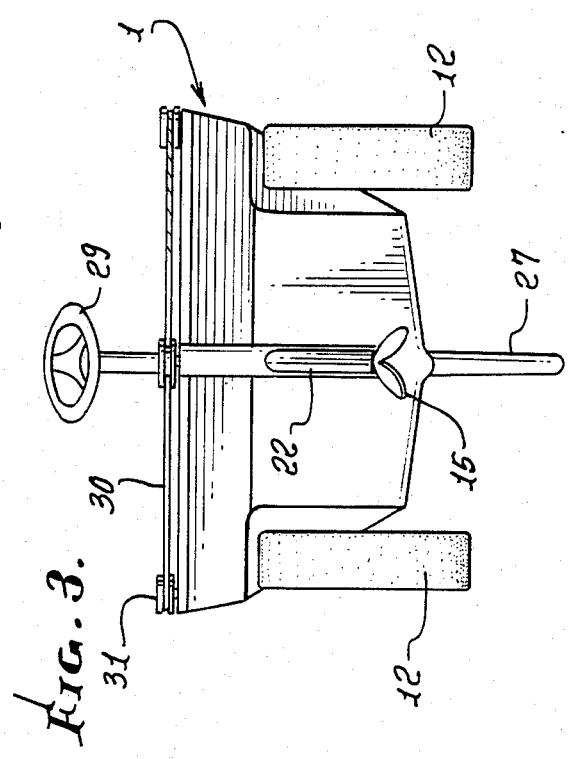

PEDAL POWERED SAILBOAT

BACKGROUND OF THE INVENTION

This invention relates to a pedal powered amphibous sailboat. The pedalling force exerted by one or more occupants is utilized to drive a screw propeller and a pair of wheels of the apparatus without the use of fossil fueled combustion engines or electricity.

This inventive boating apparatus accordingly helps enhance a tranquil mood of the user(s) in that the noise usually associated with electric engines or fossil fueled engines is avoided. Although the unique sailboat is designed to be pedalled by two occupants, one occupant can also conveniently operate the device.

Accordingly, with use of the inventive boating apparatus, pleasure seekers and exercise takers may find themselves in a serene atmosphere, for instance, enjoying the land and water of lakeside or seaside resorts.

SUMMARY OF THE INVENTION

The present invention provides a pedal powered amphibious sailboat apparatus. In one embodied form, the inventive boating apparatus comprises a relatively light-weight hull with peripheral air tanks along the interior walls of the hull, two pedalling stands which translate the rotational movement of the foot pedalling by one or two occupants to a gearing system by means of drive chains, which synchronously causes rotational movements of a screw propeller and a pair of wheels in the rear of the hull. Accordingly, the unique pedal powered sailboat apparatus of the present invention is capable of cruising water with pedal power of the occupants and capable of land transportation without use of a fossil fueled combustion engine or electricity.

In more detail, the pedal powered amphibious boating apparatus preferably is equipped with pairs of front and rear wheels, the front pair for steering and the rear pair for powering the device on land.

Drive means for a light weight hull of the device includes a screw propeller, a gearbox containing a series of gears therein, two sets of drive chains, two pairs of crank-pedals and four sprocket wheels. A first sprocket wheel is positioned at the gearbox, two sprocket wheels are located at the stern pedalling base and the fourth sprocket wheel is provided at the bow pedalling base, along with suitable sailing rig. The screw propeller is fixedly mounted at the end of a pinion shaft of a bevel gear and is operated by pedal power.

BRIEF DESCRIPTION OF THE DRAWINGS

FIG. 1 is a side elevational view of a presently preferred embodied form of the invention showing a pedal powered sailboat apparatus in accordance with the invention;

FIG. 2 is a top plan view of the sailboat apparatus as shown in FIG. 1;

FIG. 3 is a rear side elevational view of the sailboat as shown in FIG. 2;

FIG. 4 is a frontal side elevational view of the sailboat as shown in FIG. 2;

DESCRIPTION OF THE PREFERRED EMBODIMENTS

Figure 5:
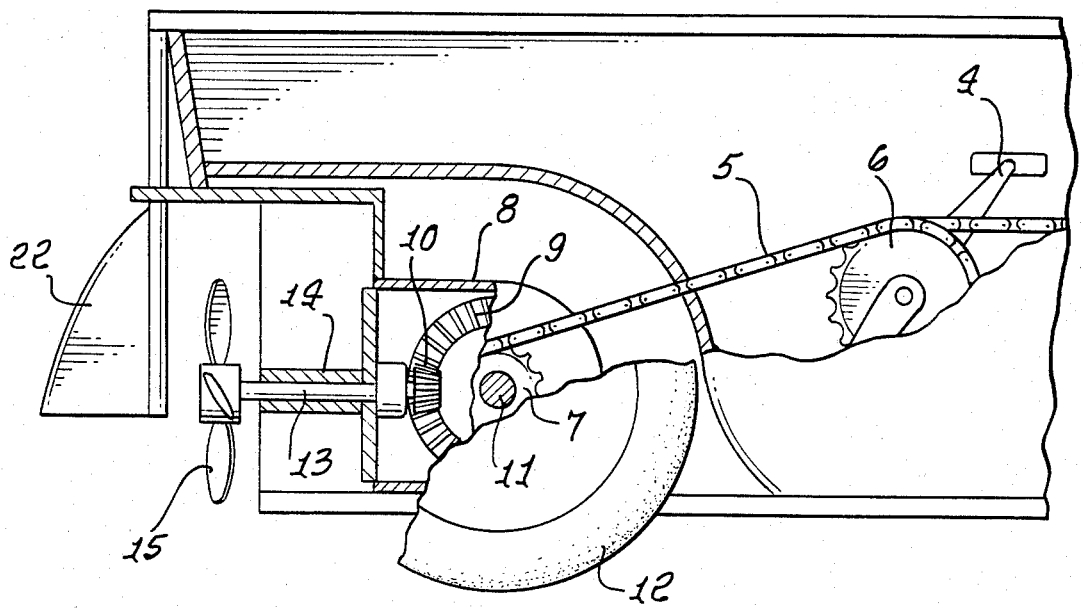
FIG. 5 is an enlarged cross-sectional view of the stern section of the sailboat as depicted in FIG. 2.

This invention relates to a pedal powered amphibious boating apparatus to be ridden by one or two occupants. The pedalling system may be operated by both occupants, one in the bow and another in stern portion of the apparatus.

This inventive boating apparatus comprises a relatively light-weight hull with peripheral air tanks along the interior walls of the hull; two pedalling stands in combination with drive chains and four sprocket wheels. A first sprocket wheel is mounted on a drive shaft of a spur gear of a gearbox, two sprocket wheels are mounted at the stern pedalling stand, and a fourth sprocket wheel at the bow pedalling stand. In operation, rotational movement of the foot pedals by one or two occupants is transmitted to the gearing system of the device by means of the drive chains, which synchronously causes rotational movement of the screw propeller and powers two traction wheels in the rear of the device. Accordingly, the device is capable of travel on beach and cruising on water.

In one embodied form, the unique boating apparatus further includes sailing rig in the bow portion of the hull capable of convertin or assisting the pedal powered operation with wind power.

Referring now to the drawings, FIGS. 1 and 2 illustrate the general structure of a preferred embodied form of the inventive sailboat.

The pinion shaft is supported by a marine bearing and is mounted with the screw propeller at the end. Accordingly, when pedalling force is transmitted to the drive means, a rotational movement of the screw propeller and rear wheels of the device is effected. The combination of propeller and wheels enables the boating apparatus to be conveniently launched from lakeside or seaside in that the occupant(s) may drive the device from the beach directly into the water.

For increased stability of the hull, a center board is provided at its center which extends underneath the boat hull. A upper portion of the stabilizer panel is held by a cylindrical post provided at topside and center of the hull.

The interior of the boat hull is further provided with air tanks of the flotation type which are capable of keeping the device from sinking should the boat capsize.

Thus, the inventive apparatus provides an amphibious means of transportation completely powered by pedalling and optionally assisted by wind power and avoids the dependence on for instance, fossil fueled combustion engines. The occupant thereby enjoys a tranquil atmosphere and with healthful exercise.

Other features and advantages of the present invention will be further explained in the following detailed description in conjunction with the accompanying drawing and claims.

In more detail, the illustrated apparatus comprises a light-weight hull upon which is mounted two pedalling stands. One stand is located in the bow and the second stand in the stern. Each stand comprises drive means, a left-side chain 2 engaged on two sprocket wheels 3 for coordinated operation of foot pedals 4 by two occupants. For operation by one occupant, the sprocket wheel 3 at the stern pedalling stand is freewheeled.

Figure 6:
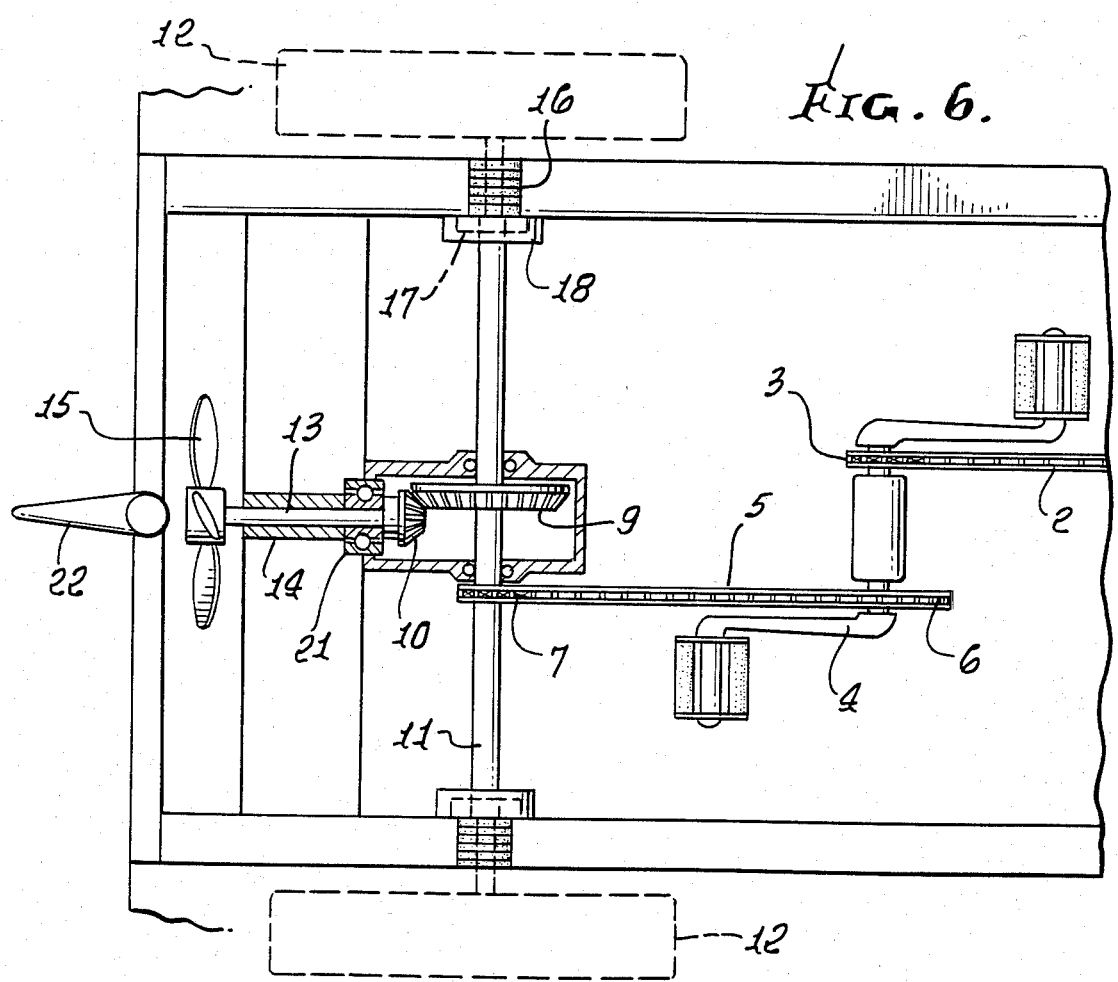
FIG. 6 is an enlarged cross-sectional top plan view of the sailboat as shown in FIG. 5.

The right side chain 5 engaged on the sprocket wheel 6 is linked with sprocket wheel 7 which is mounted on a spur gear axle shaft 11 of the gearbox 8 housing the bevel gears consisting of a spur gear 9 and a pinion 10. The respective ends of the extended arms of the spur gear axle shaft 11 are mounted with a pair of wheels 12, and the pinion shaft 13 passes through the marine bearing 14. A sealed bearing house 21 retains the pinion shaft 13 which is extended outside the rear hull facing the rudder 22, and has a screw propeller 15 mounted at its end as shown in FIGS. 5 and 6. The spur gear axle shaft arms 11 are provided with rubber seals 16 and bushings 17 along with the threaded sealing cap 18.

The front wheels 19 are manipulated with an elongated handle 20 having foremast stand 23 thereon for setting sail 34 as shown in FIG. 1 with dotted line.

In operation on land, steering on the device is carried out with the steering handle 20 which is bendable in right angle by the flexible joint 24 and fastened by the support arms 25 to the anchor bolts 26.

Once the boating apparatus is on the water, the front wheels 19 are lifted up as high as the deck level of the boat by manipulating the steering handle joint 24 to the anchor bolts 26.

The inventive boating apparatus is further provided with a center board 27 which protrudes out underneath the center of the boat through the oblong stabilizer holder 28.

The rudder 22 is manipulated by the steering wheel 29 by means of wires 30 which run through the pulleys 31 placed on hedges of the deck.

Upon coming to a boating site, the boating apparatus is lowered on beach with four wheels touching the ground. The occupant in the stern seat 32 is responsible for manipulating the steering wheel 29 to control the rudder 22, and the occupant in the bow seat 33 is responsible for steering handle 20. When the boat is buoyant in sufficient water, the front wheels 19 are lifted up as high as deck level by straightening the flexible joint 24 of the steering handle 20 and the support arms 25 branched from the steering post are fastened at the anchor bolts 26.

The center board 27 is then set up through passing the cylindrical stabilizer holder 28 thereby to have the center board 27 protruding out underneath the boat.

One illustrative form of the inventive apparatus is sized with components of the following dimensions: Sprocket wheels 3 on the left side and sprocket wheel 6 on the right side are of similarly sized having 44 teeth, and a diameter of about 7¼". Sprocket wheel 7 located at gearbox 8 has 14 teeth with a diameter of about 2 7/16". The gearing system includes a spur gear having 59 teeth and pinion having 12 teeth. Thus, one cycle of pedalling will cause the screw propeller to revolve about 15 revolutions or about 900 rpm.

From the foregoing, it may be seen that the instant invention provides an amphibious pedal powered sailboat apparatus comprising in combination:
a relatively lightweight boat hull having an upper deck portion, a bow portion and a stern portion, the hull including peripheral air tanks mounted along the interior of the hull;
a front pair of wheels mounted on the hull for steering and to provide mobility of the apparatus on land and a rear pair of wheels mounted on the hull, to provide traction and mobility of the apparatus on land;
means for elevating the front pair of wheels mounted on the hull from ground level to deck level;
a first pedalling stand fixedly mounted in the bow portion of the hull and a second pedalling stand fixedly mounted in the stern portion of the hull;
said first and second pedalling stand each comprising a pair of foot pedals mounted on the pedalling stand for rotational movement about a horizontal axis transverse to the longitudinal axis of the hull;
drive means for coordinated operation of the pair of foot pedals on the pedalling stands;
the drive means including plural drive chains and plural sprocket wheels and gearing means for translating and apportioning the rotational movement of the foot pedals to a screw propeller mounted on the hull and to the pair of rear wheels mounted on the hull;
a sail for optionally powering the apparatus by wind power; and
steering means for controlling directional movement of the apparatus;
wherein rotational movement of the foot pedals by one or more occupants is transmitted to the gearing system of the drive means which synchronously powers the screw propeller and powers the rear pair of wheels to provide amphibious operation of the apparatus.

Accordingly, the unique pedal powered exercycle sailboat apparatus of the present invention is capable of cruising water with pedalling power of the occupants and capable of land travel by the concurrent source of the pedalling power without use of fossil fueled combustion engine or electricity.

I claim:
1. An amphibious pedal powered sailboat apparatus comprising in combination:
a relatively lightweight boat hull having an upper deck portion, a bow portion and a stern portion, said hull including peripheral air tanks mounted along the interior of said hull;
a front pair of wheels mounted on said hull for steering and to provide mobility of said apparatus on land and a rear pair of wheels mounted on said hull, to provide traction and mobility of said apparatus on land;
means for elevating said front pair of wheels mounted on said hull from ground level to deck level;
a first pedalling stand fixedly mounted in the bow portion of said hull and a second pedalling stand fixedly mounted in the stern portion of said hull;
said first and second pedalling stand each comprising a pair of foot pedals mounted on said pedalling stand for rotational movement about a horizontal axis transverse to the longitudinal axis of said hull;
drive means for coordinated operation of said pair of foot pedals on said pedalling stands;
said drive means including plural drive chains and plural sprocket wheels and gearing means for translating and apportioning the rotational movement of said foot pedals to a screw propeller mounted on said hull and to said pair of rear wheels mounted on said hull;
a sail for optionally powering said apparatus by wind power; and
steering means for controlling directional movement of said apparatus;
wherein rotational movement of said foot pedals by one or more occupants is transmitted to said gearing system of said drive means which synchronously powers said screw propeller and powers said rear pair of wheels to provide amphibious operation of said apparatus.

2. The amphibious pedal powered sailboat apparatus as defined in claim 1 wherein said drive means comprises a screw propeller, a gear box containing a series of gears therein, two sets of drive chains, two pairs of crank-pedals and four sprocket wheels.

3. The amphibious pedal powered sailboat apparatus as defined in claim 2 wherein a first of said four sprocket wheels is positioned at said gear box, a second and third sprocket wheel is positioned at said second pedalling stand and a fourth sprocket wheel is positioned at said first pedalling stand.

4. The amphibious pedal powered sailboat apparatus as defined in claim 1 wherein said steering means comprises a steering handle having a flexible joint therein.

5. The amphibious pedal powered sailboat apparatus as defined in claim 1 and further comprising a center board mounted on said boat hull which protrudes out underneath the center of said hull through an oblong stabilizer holder.

* * * * *